United States Patent [19]
Muranaka

[11] Patent Number: 4,537,199
[45] Date of Patent: Aug. 27, 1985

[54] ULTRASONIC DIAGNOSTIC APPARATUS

[75] Inventor: Yuuichi Muranaka, Ootawara, Japan

[73] Assignee: Tokyo Shibaura Denki Kabushiki Kaisha, Kawasaki, Japan

[21] Appl. No.: 582,538

[22] Filed: Feb. 22, 1984

[30] Foreign Application Priority Data

Feb. 22, 1983 [JP] Japan ................................ 58-26953
Mar. 10, 1983 [JP] Japan ................................ 58-38226

[51] Int. Cl.³ .............................................. A61B 10/00
[52] U.S. Cl. ......................................... 128/660; 73/631
[58] Field of Search ............................... 128/660–661; 73/625–626, 631

[56] References Cited

U.S. PATENT DOCUMENTS

| 3,033,029 | 5/1962 | Weighart | 73/67.8 |
|---|---|---|---|
| 4,016,750 | 4/1977 | Green | 73/67 |
| 4,031,743 | 6/1977 | Kossoff et al. | 73/67.8 |
| 4,043,181 | 8/1977 | Nigam | 73/67.8 |
| 4,140,107 | 2/1979 | Lancee et al. | 128/2 |
| 4,398,539 | 8/1983 | Proudian | 128/660 |
| 4,398,540 | 8/1983 | Takemura et al. | 128/660 |
| 4,407,163 | 10/1983 | Hunt et al. | 128/660 X |
| 4,418,575 | 12/1983 | Hunt et al. | 128/660 X |
| 4,432,236 | 2/1984 | Nagasaki | 128/660 X |
| 4,452,085 | 5/1984 | Pelc et al. | 128/660 X |

FOREIGN PATENT DOCUMENTS

| 68420 | 10/1975 | Australia . |
| A1-61924/80 | 3/1981 | Australia . |
| B-55573/80 | 4/1981 | Australia . |
| 0077585 | 4/1983 | European Pat. Off. . |
| 1415759 | 11/1975 | United Kingdom . |
| 1536930 | 12/1978 | United Kingdom . |
| 2011074 | 7/1979 | United Kingdom . |
| 2024425 | 1/1980 | United Kingdom . |
| WO80/00070 | 4/1981 | PCT Int Appl. . |

Primary Examiner—Kyle L. Howell
Assistant Examiner—Francis J. Jaworski
Attorney, Agent, or Firm—Finnegan, Henderson, Farabow, Garrett & Dunner

[57] ABSTRACT

In an ultrasonic diagnostic apparatus, the center frequency of the spectrum of the received echo signal is decreased, depending upon the penetration depth of the patient. This phenomenon is noticeable when the frequency of the excited ultrasonic waves is selected to a higher range. The ultrasonic diagnostic apparatus employs an STC circuit, a gain of which is varied in accordance with the penetration depth of the patient.

13 Claims, 12 Drawing Figures

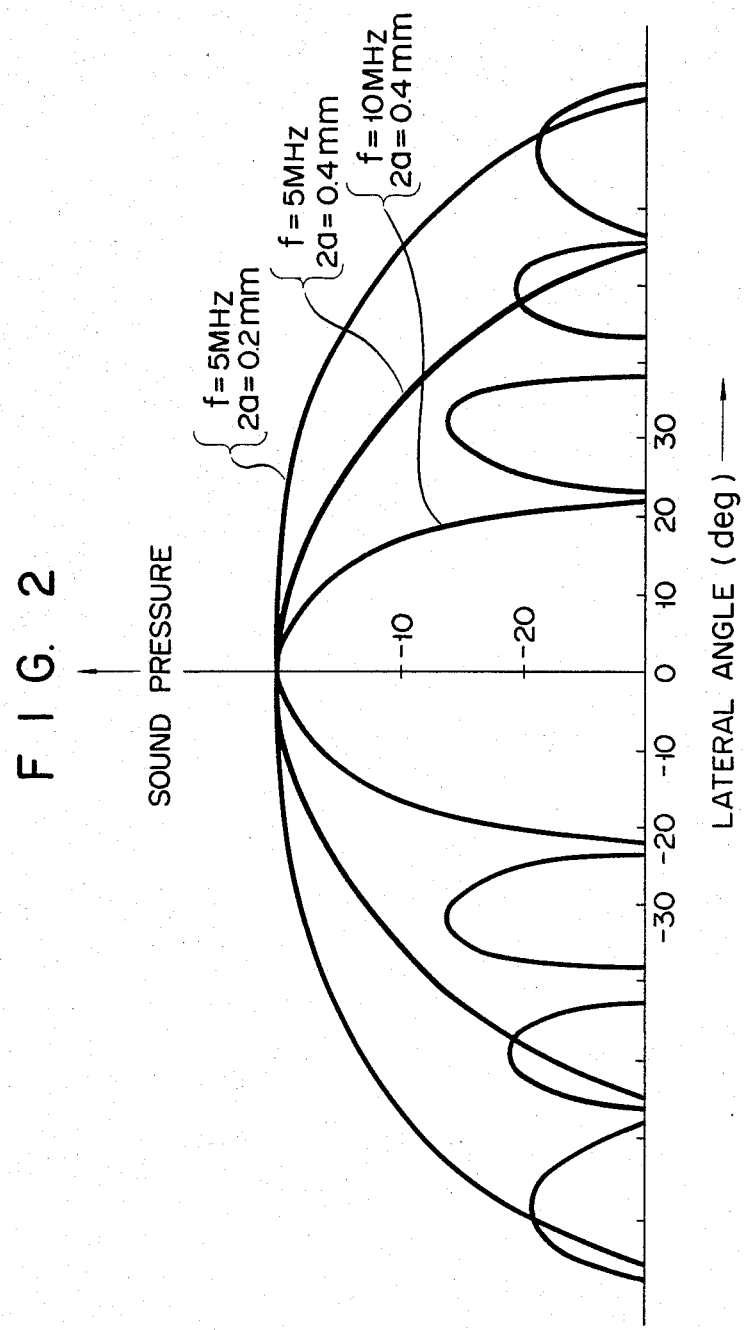

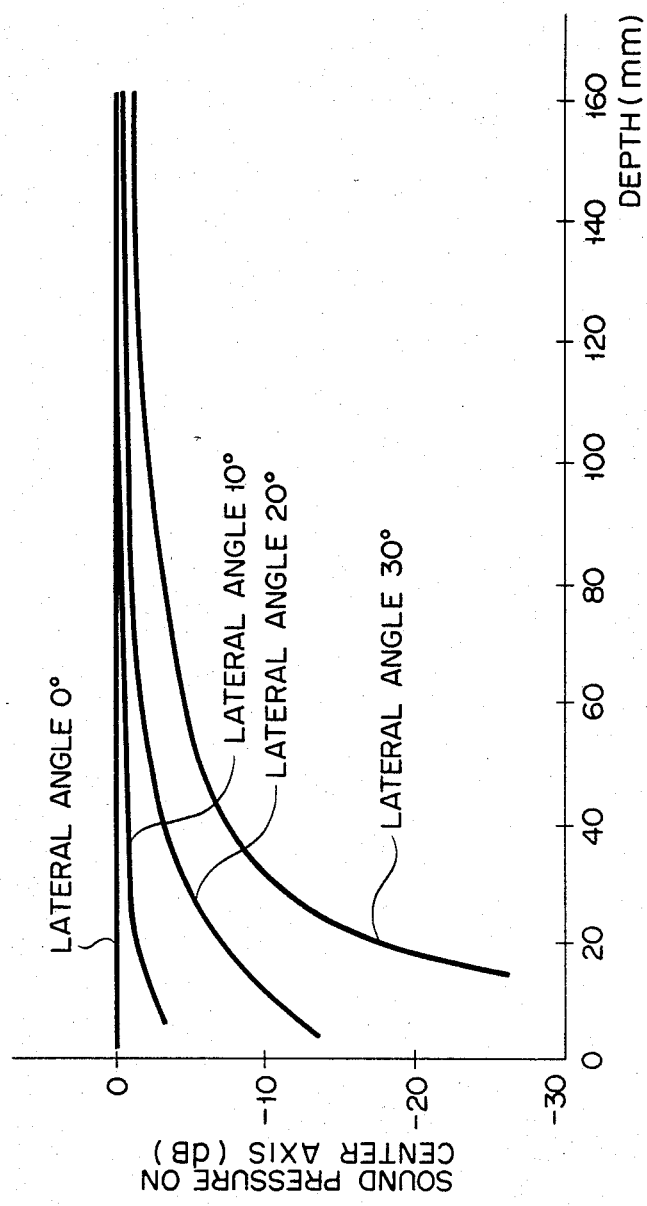

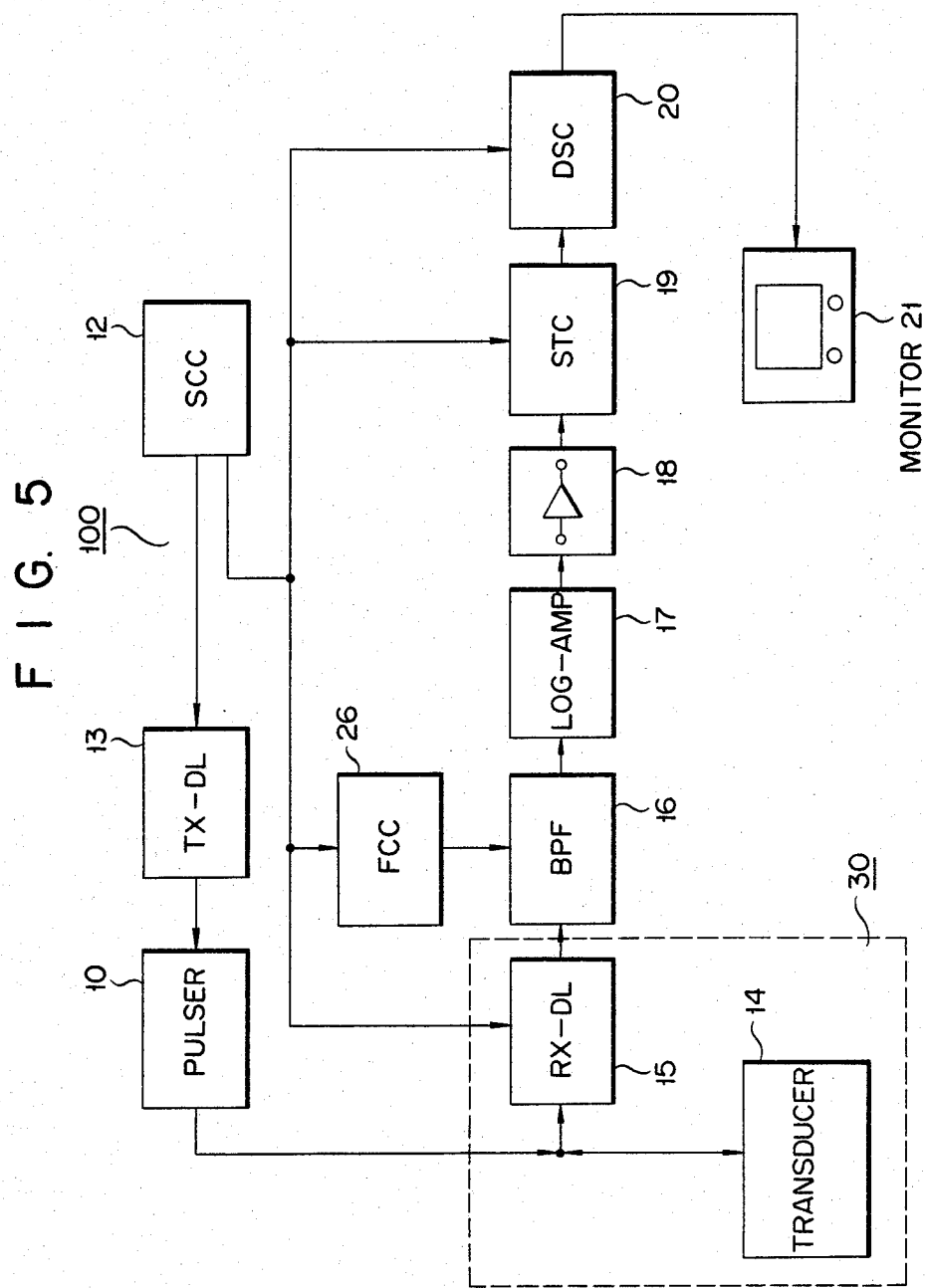

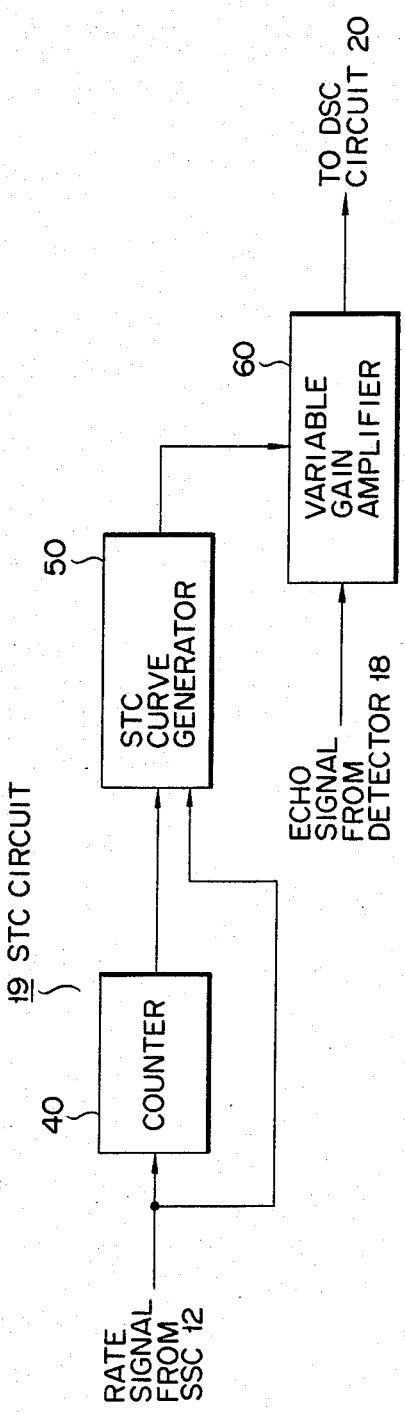
F I G. 7A
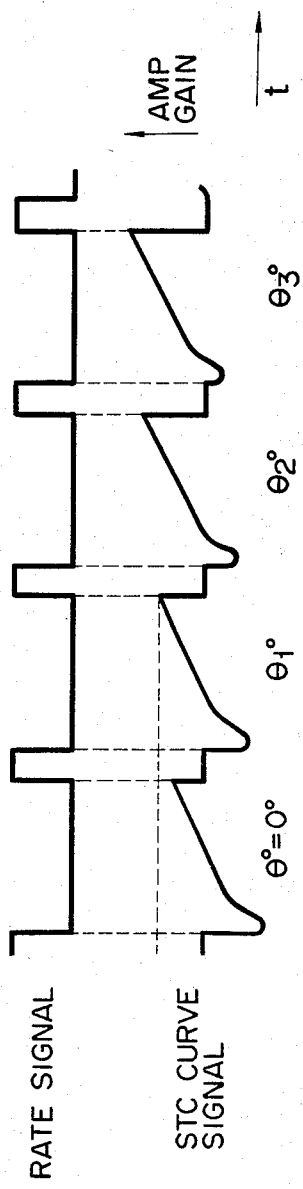
F I G. 7B

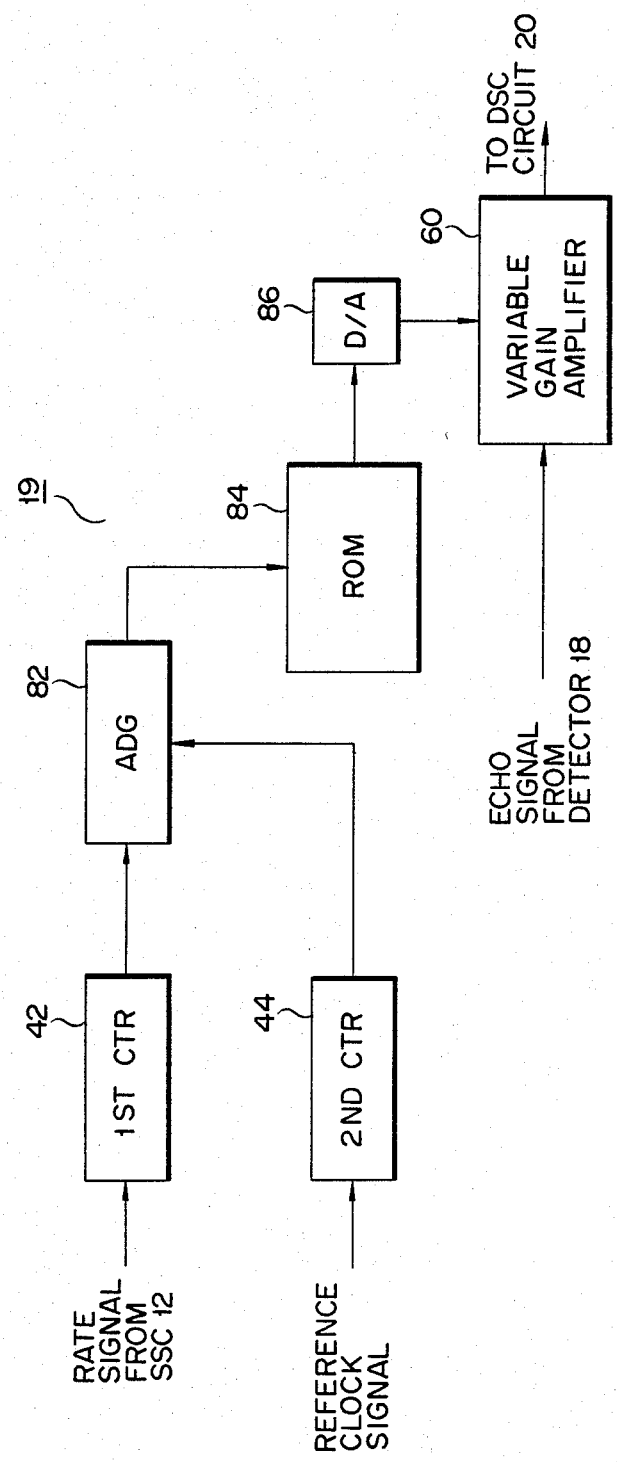

ULTRASONIC DIAGNOSTIC APPARATUS

BACKGROUND OF THE INVENTION

The present invention relates to an ultrasonic diagnostic apparatus which has an array of ultrasonic vibration elements that form an ultrasonic transducer and are excited to generate ultrasonic waves with a predetermined delay time so that ultrasonic beams are deflected.

First, the directivity of an ultrasonic beam emitted from a rectangular ultrasonic vibration element, which is schematically shown in FIG. 1, will be explained. Directivity R of the beam in a remote sound field is given as follows:

$$R = \left| \frac{\sin(ka\cos\alpha)}{ka\cos\alpha} \cdot \frac{\sin(kb\cos\beta)}{kb\cos\beta} \right|, \quad (1)$$

where "k" is the number of waves and "b" is the width of the rectangular ultrasonic transducer element.

Directivity R in xz plane is represented by the following equation:

$$Rxz = \left| \frac{\sin(ka\sin\gamma)}{ka\sin\gamma} \right| \quad (2)$$

where "2a" is an aperture width along x axis and $\gamma = \pi/2 - \alpha$.

FIG. 2 shows the directivity of an ultrasonic beam emitted from a rectangular vibration element. From FIG. 1 and equation (2) it is understood that directivity "Rxz" in a remote sound field becomes sharp as the aperture width "2a" increases, assuming that the frequency of the excited ultrasonic wave is constant. It is also understood that directivity Rxz becomes sharp as the frequency increases, assuming that the aperture width is constant. When an ultrasonic beam emitted from the ultrasonic vibration element is deflected or steered with a predetermined time delay, the directivity of the beam causes a sound pressure along the central axis of the element, i.e., the z axis in this case, to decrease. This decrease of sound pressure becomes more noticeable if the frequency of the excited ultrasonic wave becomes higher, the aperture width "2a" becomes greater, or the deflection angle of the ultrasonic wave becomes larger.

Recently, an attention is drawn to an ultrasonic diagnostic apparatus which can utilize high-frequency ultrasonic waves for improvement of the longitudinal and lateral resulutions. In the apparatus, a pulse echo signal reflected from an object is passed through a reception filter to derive a high-frequency component thereof since it is difficult to manufacture an ultrasonic vibration element which can be excited at a high frequency. In the deep depth of the object, e.g., a patient, however, the central frequency of the spectrum of a received ultrasonic pulse signal drops in frequency with depth of penetration. In the conventional ultrasonic diagnostic apparatus, the following measurements are taken for correction. Since the central frequency of the spectrum of an output signal from the reception filter is further decreased in accordance with the depth of the patient, and a sound pressure also progressively decreases toward the deepest region, as shown in FIGS. 3 and 4 respectively, it has been attempted to vary the sensitivity of the signal-receiving circuit in conformity to that depth of the patient. That is, the sound pressure has been corrected by the Sensitivity Time Control (STC) circuit.

However, a decline in the sound pressure arises not only when the ultrasonic beams are attenuated in the deep depth of the patient, but also in the following cases. Each vibration element of the known ultrasonic diagnostic apparatus emits a low-frequency ultrasonic beam. For low-frequency ultrasonic beams, it is unnecessary to take into consideration a decrease in sound pressure, which results from the directivity of the element, even if the ultrasonic beam is deflected, or steered. In the present invention, the ultrasonic vibration element needs to emit an ultrasonic beam of a high frequency and also the ultrasonic beam is deflected. Consequently, a decline in sound pressure cannot be overlooked. FIG. 4 shows the relationship between the depth of a patient with respect to a lateral angle of an ultrasonic beam, and a sound pressure on the central axis of the ultrasonic vibration element. As seen from the above relation, the sound pressure considerably falls at a relatively shallow region of the patient when the frequency of the ultrasonic wave becomes high and the deflection angle of the ultrasonic beam becomes great. When, under such a condition, the B-scan image is displayed on a TV monitor, the displayed image grows darker as the ultrasonic beam is more deflected at a shallow region of the patient.

Moreover there is another problem that the center frequency of the spectrum of the reception filter output drops in frequency with depth of penetration through the patient.

SUMMARY OF THE INVENTION

The object of the present invention is to provide an ultrasonic diagnostic apparatus which can produce a scan image with high longitudinal and lateral resolutions, even when an ultrasonic beam is deflected and ultrasonic vibration elements are excited at a high frequency.

According to this invention, there is provided an ultrasonic diagnostic apparatus comprising:

transmitter means including pulse generation means from which exciting pulses for ultrasonic waves are produced, and means for deflecting the ultrasonic waves when transmitted;

transducer means including an array of ultrasonic vibration elements, at least two of which elements are excited by the exciting pulses so as to apply the deflected ultrasonic waves toward an object under investigation;

receiver means including means for deflecting an echo signal which is derived from the transducer means when the ultrasonic waves are reflected from the object;

correction means by which characteristics of the echo signal received by the receiver means are corrected so as to restore the deflected ultrasonic waves when received to the same conditions as when transmitted;

means for displaying a tomographic image of the object under investigation based upon the echo signal processed in the correction means; and system control means from which a rate signal is supplied to the transmitter means, the receiver means and the correction means for purposes of the timing control thereof.

BRIEF DESCRIPTION OF THE DRAWINGS

For a better understanding of these and other objects and features of the invention, reference is had to the following detailed description of the invention to be read in conjunction with the following drawings, in which:

FIG. 2 shows the directivity of an ultrasonic beam emitted from the ultrasonic vibration element shown in FIG. 1;

FIG. 4 illustrates the relationship between a sound pressure along the central axis of the element and the depth of the patient, with the deflection angle of an ultrasonic beam taken as a parameter;

FIG. 5 is a block diagram of an ultrasonic diagnostic apparatus, according to one preferred embodiment of the present invention;

FIG. 7A is a block diagram of an STC circuit used in the apparatus of FIG. 5;

FIG. 7B shows waveforms of a rate signal and an STC curve signal of the STC circuit of FIG. 7A;

FIG. 9 is a block diagram of an STC circuit used in still another ultrasonic diagnostic apparatus, according to the invention.

DETAILED DESCRIPTION OF THE PREFERRED EMBODIMENTS

Figure 1:
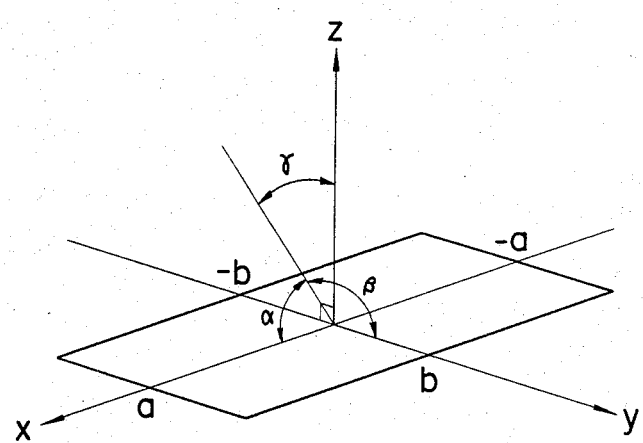
FIG. 1 illustrates a radiation pattern of a rectangular ultrasonic vibration element.
Figure 3:
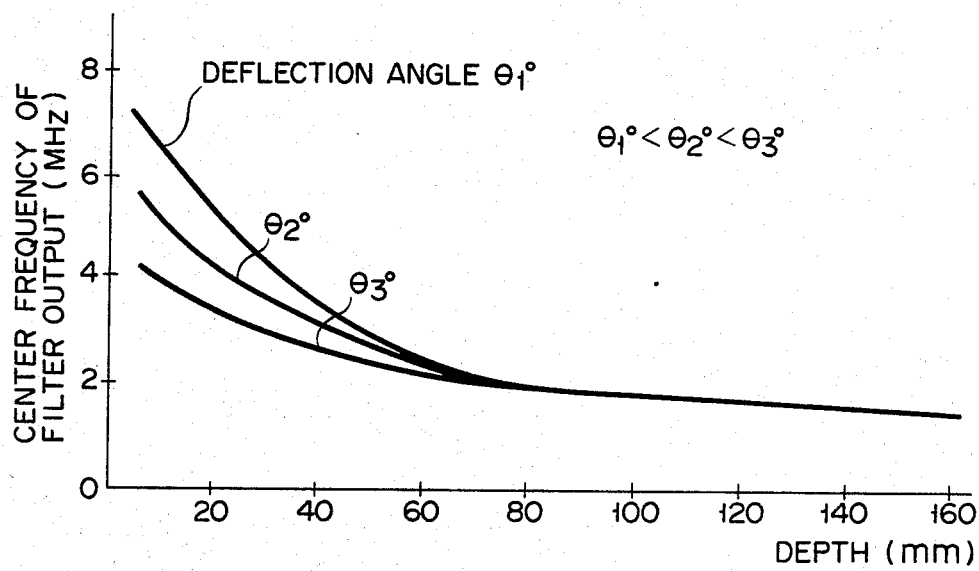
FIG. 3 indicates the relationship between the central frequency of a filter output and the depth of a patient, with the deflection angle of an ultrasonic beam taken as a parameter.

FIG. 5 is a block diagram of an ultrasonic diagnostic apparatus 100 according to the invention. A pulser 10 emits a series of exciting pulses under the control of a system control circuit 12. The system control circuit 12 produces a rate signal to control not only the pulser 10 but also circuit elements (will be described later). A transmission delay circuit 13 performs the phase control to deflect and focus an ultrasonic beam by giving predetermined time delays to the exciting pulses. An array of the ultrasonic vibration elements (will be described later) as a transducer 14 applies ultrasonic waves toward a patient (not shown), receives ultrasonic echo signals reflected therefrom, and converts these ultrasonic echo signals into a plurality of electric echo signals. A reception delay circuit 15 carries out the phase control on the electric echo signals to deflect and focus the received ultrasonic beams. It also combines a plurality of the echo signals into a single echo signal. The transducer 14 and the reception delay circuit 15 constitute a receiver section 30. The single echo signal is applied to a band pass filter 16. The filter 16 extracts the given frequency components of the echo signal which correspond to the penetration depth of the patient. A filter control circuit 26 varies the coefficient of the filter 16 so as to derive the above-mentioned frequency components (will be described later).

The apparatus further comprises a log amplifier 17 which carries out a log compression to broaden a dynamic range of the received echo signal and a detector 18 which effects the full wave rectification of the echo signal and produces an envelope component thereof. Also provided is a sensitivity time control circuit 19 (hereinafter referred to as "STC"). The STC circuit 19 corrects a sound pressure corresponding to the penetration depth of that portion of the patient under investigation, and also a sound pressure corresponding to the deflection angle of an ultrasonic beam (will be described later).

The echo signal from the STC circuit 19, i.e., a video signal, is processed by a digital scan converter circuit 20 (hereinafter referred to as "DSC"). As a result, a monitor 21 displays a tomographic image corresponding to a video signal from the DSC circuit 20 for the diagnosis of the patient.

An operation of the ultrasonic diagnostic apparatus described above will now be explained more in detail. A rate signal from the system control circuit (SCC) 12, i.e., a control signal, is supplied to the transmission delay circuit 13, the reception delay circuit 15, the filter control circuit 26, the STC circuit 19, and the DSC circuit 20, respectively. A series of the ultrasonic waves generated by the pulser 10 is supplied to the transducer 14 under the control of the reception delay circuit 13. This circuit 13 carries out the phase control of the ultrasonic waves, thus deflecting and focusing the waves based upon the rate signal. The pulser 10 produces exciting pulse signals for actuating the ultrasonic vibration of the transducer 14. The ultrasonic waves projected from the transducer 14 are distributed in a shape outline like a trapezoid due to the deflection of the ultrasonic waves.

Upon receipt of the exciting pulse signals applied from the pulser 10, the ultrasonic vibration elements of the transducer 14 radiate ultrasonic waves to a patient and thereafter receive reflections as the ultrasonic beams from the patient and convert them into a plurality of echo signals. Those echo signals are delivered to the reception delay circuit 15 for the focusing and deflection purposes. The reception delay circuit 15 conducts the phase control on the echo signals in accordance with the rate signal from the system control circuit 12 and combines a plurality of echo signals into a single echo signal. This echo signal is delivered to the band pass filter 16. The filter 16 functions in such a manner that the band width and the center frequency of the band pass filter are varied by changing its filter characteristic depending on the penetration depth of the object, since the high frequency signal component of the received echo signal is lost and the center frequency of the echo signal is decreased in accordance with the penetration depth of the patient. This filter function is necessary for the following reasons. If the ultrasonic beams have as high a frequency as possible, both longitudinal resolution and lateral resolution of the apparatus will be improved. Furthermore the high-frequency components of ultrasonic beams are more noticeably attenuated in the greater penetration depth of the patient. Therefore, the filter coefficient of the band pass filter 16 is controlled by a control signal given by the filter control circuit 26 based upon the rate signal from the system control circuit 12, in such a manner that the above-described filter characteristics of the band pass filter 16 are realized.

The echo signal filtered through the band pass filter 16 is subjected to a log-compression in the log amplifier 17. It then undergoes full-wave rectification in the detector 18 and is supplied to the STC circuit 19. The STC circuit 19 performs the sound pressure correction which matches the penetration depth of the patient and also the sound pressure correction which matches the deflection angle of the ultrasonic beams. Both corrections are effected in accordance with the rate signal from the system control circuit 12. In other words, the ultrasonic diagnostic apparatus according to the invention is so operated that its sensitivity to the echo signals from the greater penetration depth of the patient and also to the echo signals from the shallow regions of the patient in the case of the greater deflection angle may increase. An echo signal, which has undergone the sound pressure control in the STC circuit 19, is further subjected to video processing in the DSC circuit 20 based upon the rate signal from the system control circuit 12. The echo signal thus processed is displayed on the monitor 21, as a tomographic image of the patient. Since the STC circuit 19 has already performed the sound pressure correction matching the deflection angle of the ultrasonic beam, the tomographic image representing the shallow region of the patient does not grow dark even when the ultrasonic beam is considerably deflected.

In accordance with the invention, the longitudinal and lateral resolutions can be reliably elevated by varying the property of the STC circuit 19 (hereinafter referred to as "STC characteristic curve") in conformity to the deflection angle of the ultrasonic beam. This feature will now be described in more detail.

Figure 6:
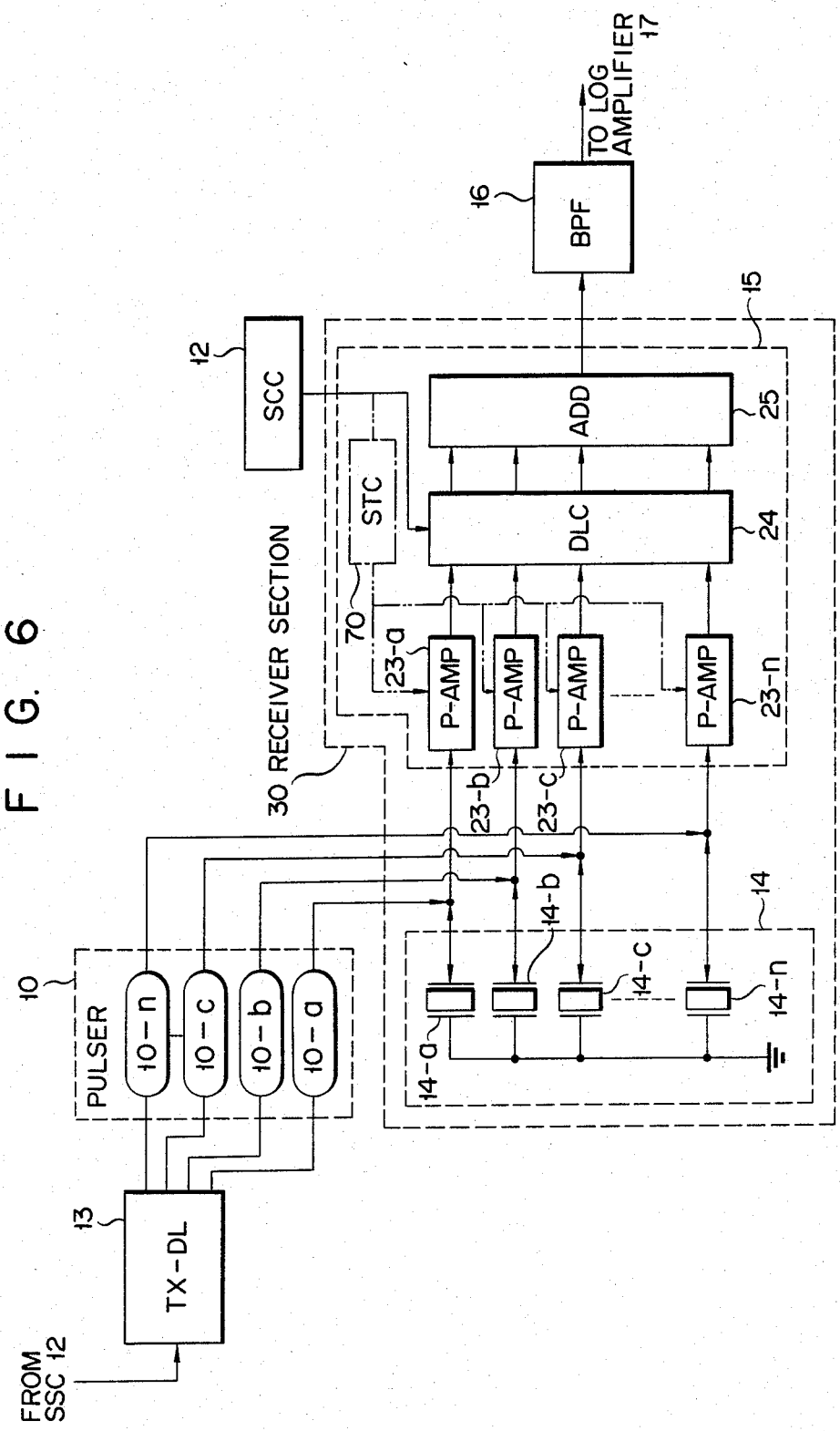
FIG. 6 is a block diagram of the internal circuit of the receiver section shown in FIG. 5.

FIG. 6 shows the internal circuit of the receiver section 30. As shown in this circuit, the rectangular ultrasonic vibration elements 14-a, 14-b, 14-c, ... 14-n of the transducer 14 are arranged in array. The pulser 10 is constructed by a plurality of pulser circuits 10-a, 10-b, 10-c, ... 10-n, which are connected to the corresponding vibration elements 14-a, 14-b, 14-c, ... 14-n respectively. A series of the exciting pulse is applied from the pulser 10 to the respective ultrasonic vibration elements 14-a, 14-b, 14-c, ... 14-n. The exciting pulses are previously subjected to a prescribed treatment, for example, a time delay required for the focusing and deflection of ultrasonic waves, in the transmission delay circuit 13. The ultrasonic waves from the elements 14-a, 14-b, 14-c, ... 14-n are projected toward the patient and thereafter reflected from the boundaries and discontinuous portions thereof. The ultrasonic echo pulses reflected them are received by the same elements 14-a, 14-b, 14-c ... 14-n and then converted into a series of the echo signals. A plurality of the echo signals, equal in number to the vibration elements, are supplied from transducer 14 to the preamplifiers 23-a, 23-b, 23-c, ... 23-n and amplified to a predetermined level respectively. The amplified echo signals are supplied to a reception delay circuit 24 so as to perform the phase control as they are delayed by the given delay times in the circuit 24. As a result, conditions of the echo signals become equal to that of the exciting pulse signals in the transmission delay circuit 13. This phase control allows for the prescribed focusing and deflection of each of the echo signals. The echo signals thus processed are combined into a single echo signal in an adder 25.

The operation of the STC circuit 19 may now be described with reference to the typical embodiments. It should be noted that the more the ultrasonic waves are deflected while penetrating through the patient, the more the sound pressure on the central axis of the element is reduced (FIG. 4). Therefore, the gain of the amplifier in the STC circuit 19 must be increased in direct proportion to the deflection angle of the beam. On the other hand, lowering the center frequency of the received echo pulse signals, corresponding to the penetration depth of the patient, is compensated by the band pass filter 16.

The structure and function of the STC circuit 19 as a first example may now be described with reference to FIGS. 7A and 7B. A rate signal from the system control circuit 12 is supplied to a counter 40, which produces data representing the angles at which the transducer 14 has deflected the ultrasonic beams. This data is supplied to an STC curve generator 50 which also receives the rate signal. The curve generator 50 produces from the two pieces of data an STC curve signal (=a degree signal of the deflections of the ultrasonic beams) as shown in FIG. 7B. That is, the gain of a variable gain amplifier 60 is progressively increased as the deflection angle $\theta°$ of the ultrasonic beams is broadened from 0° to $\theta_3°$. As shown in FIG. 7B, when the ultrasonic beams are deflected by a small angle of, e.g., $\theta_1°$, the gain of the gain amplifier 60 must be reduced in a near sound field (immediately after a rate signal) and must be increased in a remote sound field (immediately before the rate signal) in order to provide a higher sound pressure. Further, since the reduction of the sound pressure is proportional to the increase of the deflection angle of the ultrasonic beams the gain amplifier 60 is so designed as to provide a relatively large gain throughout the whole sound field as seen from FIG. 7B.

Figure 8A:
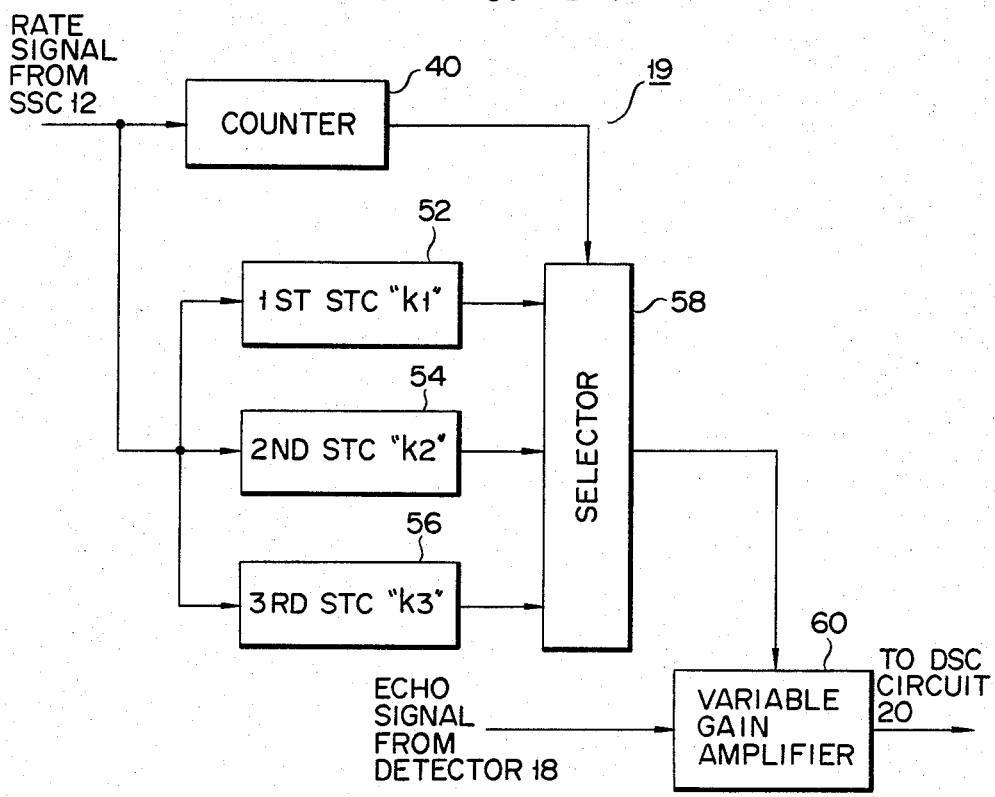
FIG. 8A is a block diagram of an STC circuit used in another ultrasonic diagnostic apparatus, according to the invention.
Figure 8B:
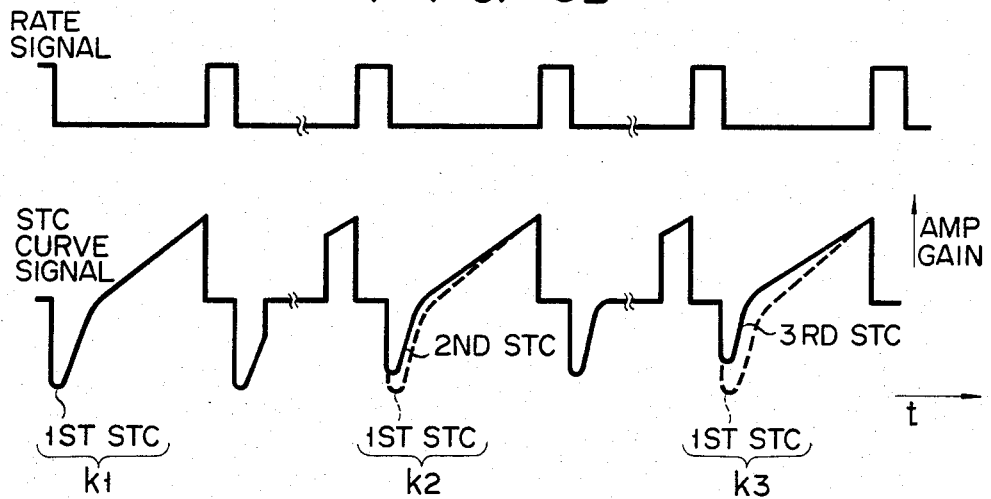
FIG. 8B shows waveforms of a rate signal and an STC curve signal of the STC circuit of FIG. 8A.

The structure and function of the STC circuit 19 as a sound example may now be described with reference to FIGS. 8A and 8B. Like or the same elements as those of FIG. 7A are not described for the sake of clarity. As shown in FIG. 8A, the STC circuit 19 has three STC curve generators 52, 54 and 56 which are connected parallel to each other. These STC curve generators 52, 54, 56 are designed to independently produce pieces of data k1, k2 and k3 showing STC curves of the different deflection angles. The deflection angle (data k1) of the STC curve from the first STC curve generator 52 is smaller than that (data k3) of the STC curve from the third STC curve generator 56. The deflection angle (data k2) of the second STC curve generator 54 is greater than that (data k1) of the first generator 52 and smaller than that (data k3) of the third generator 56. The deflection angle (data k3) corresponds to a maximum angle at which the ultrasonic beam can be deflected by the transducer 14. As shown in FIG. 8B, an STC curve signal (=a degree signal of the deflection of the ultrasonic beams) produced by the first STC curve generator 52 has a waveform different from that of the STC signal produced by the third STC curve generator 56 in respect of both gain and gradient. Obviously, the third STC curve generator 56 produces a greater gain. The STC curve signals are selectively supplied to a variable gain amplifier 60 by means of a selector 58 which selects one of the STC signals in accordance with an output signal (deflection angle data) from the counter 40.

A description may now be made with reference to FIG. 9 of the structure and function of the STC circuit 19 as a third example. The rate signal is supplied to a first counter 42 which furnishes data on the deflection angle of the ultrasonic beams. Thereafter, the rate signal is input to an address generator 82. The address generator 82 is supplied with not only data on the deflection angle of the ultrasonic beams but also data on the penetration depth of the patient under examination.

An output address signal from the address generator 82 is supplied to a ROM 84 which stores digital data on the various types of aforementioned STC curves. A reference clock signal is supplied to a second counter 44. An output signal is applied to the address generator 82 and used as a reference clock signal (a depth information signal) for ROM 84. An STC curve signal read out of ROM 44, in accordance with the above-mentioned digital data, is converted into an analog signal by a D/A converter 86. The analog signal is supplied to the variable gain amplifier 60. Thus, the gain control is carried out in the same way as described earlier. The operation waveform of the STC circuit according to the third example, is similar to those shown in FIGS. 7B and 8B.

An ultrasonic diagnostic apparatus according to a second embodiment of the invention will now be described in more detail. The structure and operation of this embodiment resemble those of the first embodiment shown in FIGS. 5 and 6.

With the second embodiment shown in FIG. 6, an STC circuit 70 is assembled in the receiver section 30 so as to vary the gains of the preamplifiers 23-a, 23-b, 23-c, . . . 23-n in accordance with the slopes of various STC curves. Since the STC circuit 70 is employed in the section 30, the STC circuit 19 of FIG. 5 can be omitted in this embodiment. Referring to FIG. 6, the pulse signals from the pulser 10 which are controlled by the transmission delay circuit 13 excite the ultrasonic vibration elements 14-a to 14-n thereby transmitting the ultrasonic waves to the patient. Ultrasonic reflections (ultrasonic beams) from the patient are received by the same ultrasonic vibration elements 14-a to 14-n and amplified by the preamplifiers 23-a to 23-n, thus forming a series of echo pulse signals. In this case, the amplifications of the preamplifiers 23-a to 23-n are controlled by a correction signal, which has been produced by the STC circuit 70, in accordance with the rate signal from the system control circuit 12. Therefore, the echo signals are corrected with respect to the sound pressure. That is, the STC circuit 70 delivers two sound-pressure correction signal, which correspond to the penetration depth of the patient under examination and to the deflection angle of the ultrasonic beams, in accordance with the rate signal from the system control circuit 12. These correction signals may control the amplifications of the respective preamplifiers 23-a to 23-n. The echo signals corrected in the preamplifiers with respect to the sound pressure, are then processed under the phase control in the reception delay circuit 24, as same as in the first embodiment, in order to deflect and focus the ultrasonic beams (=echo signals). The echo signals thus controlled are combined by the adder 25 into a single echo signal, which is applied to the band pass filter 16. Operations following the band pass filter 16 are the same as in the first embodiment (FIG. 5). Since the amplifications of the preamplifiers 23-a to 23-n are corrected by a correction signal from the STC circuit 70, it is possible to correct the sound pressure corresponding to the penetration depth of the patient and also the sound pressure corresponding to the deflection angle of the ultrasonic beams. Consequently, whenever the ultrasonic beams are deflected by a large angle, a tomographic image displayed on the monitor 11 can be prevented from growing dark at a spot corresponding to the shallow region of the patient.

A description may now be made of the operation of the ultrasonic diagnostic apparatus 100 according to a third embodiment of this invention. This embodiment has basically the same structure as that of FIG. 5. The feature of the third embodiment is that the filter coefficient or the filter characteristic of the band pass filter 16 is controlled by the filter control circuit 26, in accordance with the penetration depth of the patient. That is, since the high-frequency component of the echo signal is lost depending upon the penetration depth of the patient and also the center frequency of the echo signal is lowered, the band width as well as the center frequency of the band pass filter 16 are varied in accordance with the penetration depth.

Figure 10:
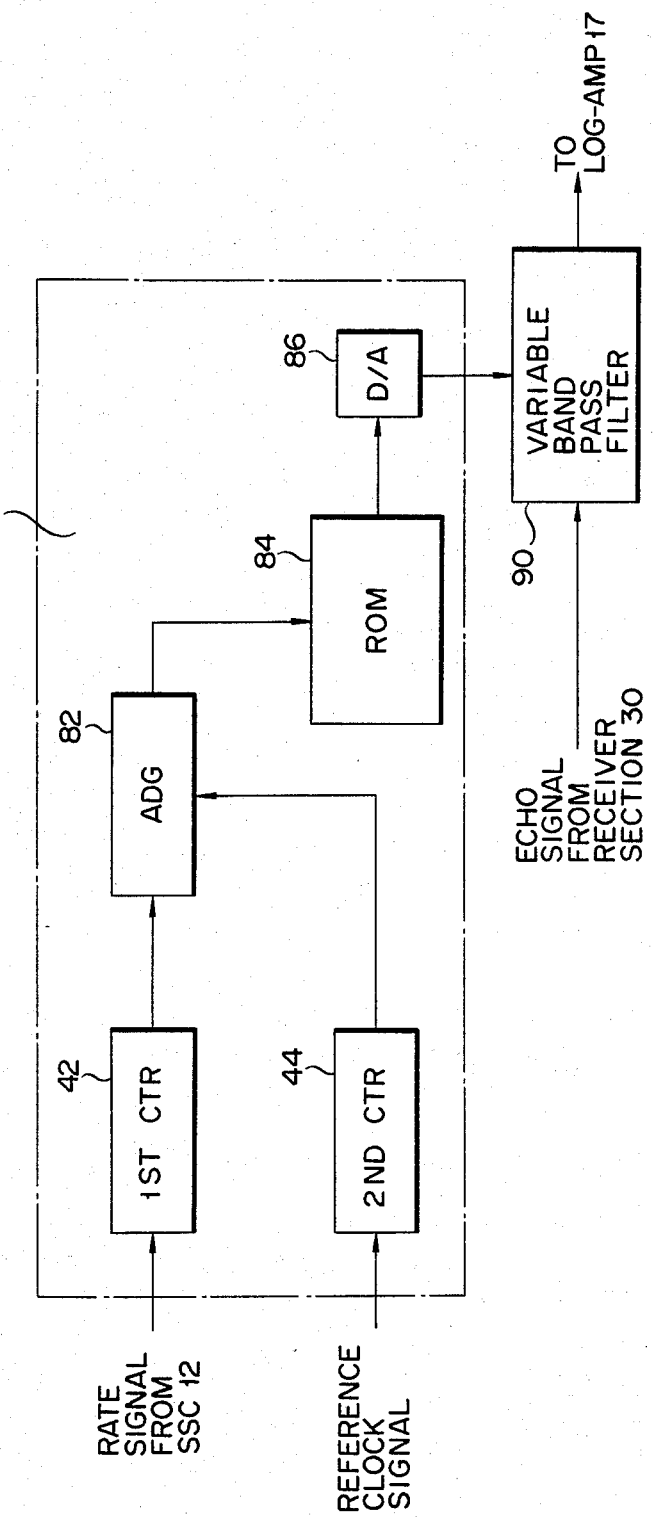
FIG. 10 is a block diagram of a filter control circuit and a variable band pass filter used in the apparatus of FIG. 5.

The filter control circuit 26 will now be described with reference to FIG. 10 in greater detail. As shown in FIG. 10, the circuit 26 comprises a ROM 84 which stores data representing the filter coefficients of a variable band pass filter 90 that correspond to the deflection angles of the ultrasonic beams at the various penetration depths of the patient. The rate signal is supplied to the first counter 42, thereby furnishing data on the deflection angles of the ultrasonic beams. A reference clock signal from a reference clock signal generator (not shown) is delivered to a second counter 44, thereby providing data showing the penetration depth of the patient. Data on the deflection angles and data on the depth of the patient are supplied to an address generator 82, whereby the signals denoting the filter coefficients are read out of ROM 84. These readout signals are supplied to a D/A converter 86 and converted into filter coefficient signals in an analog form. Those filter coefficient signals are supplied to a variable band pass filter 90 so as to vary the filter characteristic, i.e., the band width and the central frequency of the band pass filter 90 in conformity to the deflection angles of the ultrasonic beams. The third embodiment of this invention is so designed as to lower the central frequency of the band pass filter 16 as the deflection angle of the ultrasonic beams becomes greater.

The principle operations of the ultrasonic diagnostic apparatus according to the present invention will now be summarized. First, the gain of the STC circuit 19 is controlled depend upon the deflection angle of the ultrasonic beams, thereby compensating a decrease in sound pressure in the near sound field. Secondly, the filter characteristic of the band pass filter 16 is controlled based upon the deflection angle of the ultrasonic beams, thereby realizing the same compensation.

As mentioned above, the ultrasonic diagnostic apparatus according to the invention is advantageous in that a tomographic image of the patient is not affected by the deflection angle of the ultrasonic beams even when the frequency of the beams is high. Accordingly, a clear tomographic image can be displayed, and excellent longitudinal and lateral resolutions are ensured. That is, the gain of the STC circuit is made to vary with the deflection angle of the ultrasonic beams, thereby compensating the decrease of the sound pressure in a near sound field.

Moreover, the central frequency and also the band width of the band pass filter are varied in accordance with the deflection angle of the ultrasonic beams reflected from the patient, whereby the signal intensity of the echo signals in a near sound field can be kept constant regardless of how large the deflection angle of the beams. Hence, the tomographic image on the monitor is not adversely influenced by the deflection angle of the beams, thus ensuring high longitudinal and lateral resolutions.

While the invention has been described with reference to the typical embodiments, it is not restricted to those embodiments. Various modifications may be easily conceived by those skilled in the art. For instance, another STC circuit, which can only correct a sound pressure in accordance with the penetration depth of the patient, may be connected to the input of the DSC circuit 20 while the STC circuit 70 may be so designed as to only correct a sound pressure in accordance with the deflection angle of the ultrasonic beams.

What is claimed is:

1. An ultrasonic diagnostic apparatus for displaying a tomographic image of an object to be investigated, the apparatus comprising:

a transducer means, including an array of ultrasonic vibration elements, for applying beams of ultrasonic waves into the object at preselected steering angles, receiving ultrasonic echo signals reflected from the object, and converting the received echo signals into electric echo signals;

transmitter means coupled with said transducer means for applying timed electric pulses to the array of ultrasonic vibration elements in a manner that produces beams of ultrasonic waves deflected at preselected steering angles;

a variable gain amplification means coupled with said transducer means for receiving electric echo signals from said transducer means and selectively amplifying the received electric echo signals;

signal means for producing signals representative of the steering angle of each respective ultrasonic beam;

a gain sensitivity control means responsive to the deflection angle of the respective ultrasonic beams and coupled with said signal means and said variable gain amplification means for increasing the gain of the variable gain amplification means as the steering angle of the respective ultrasonic beams increases; and display means coupled with said variable gain amplification means for converting the amplified echo signals into a tomographic image of the object being investigated.

2. The ultrasonic diagnostic apparatus of claim 1 further comprising means for producing a rate signal, that means being coupled with said gain sensitivity control means.

3. The ultrasonic diagnostic apparatus of claim 2 wherein said gain sensitivity control means includes a counter coupled with said rate signal means and a sensitivity time control curve generator, coupled with said counter and said rate signal means and with said variable gain amplification means, for producing a gain control signal to control said variable gain amplification means.

4. The apparatus according to claim 2 wherein said gain sensitivity control means includes a counter coupled with said rate signal means, a plurality of sensitivity time control curve generators coupled with said rate signal means for producing a plurality of gain control signals of different amplitudes, and a selector, coupled with said counter and said plurality of curve generators and with said variable amplification means, for selectively passing a gain control signal to control said variable gain amplification means.

5. The ultrasonic diagnostic apparatus of claim 2 further comprising means for producing a reference signal, that means being coupled with said gain sensitivity control means.

6. The ultrasonic diagnostic apparatus of claim 5 wherein said sensitivity control means includes a first counter coupled with said rate signal means for deriving signals representative of the steering angles of respective ultrasonic waves, a second counter coupled with said reference signal means for deriving depth signals representative of the depths of respective ultrasonic waves, an address generator coupled with said first and second counter for producing an address signal, a memory coupled with said address generator for storing preselected digital gain control information, and a digital/analog converter, coupled with said memory and with said variable gain amplification means, for converting selected digital gain control information into an analog control signal to control said variable gain amplification means.

7. The apparatus of claim 2 further comprising an adder coupled with said transducer means for summing a plurality of said electric echo signals to obtain a single echo signal representative of the tomographic image.

8. The apparatus of claim 7 wherein said variable gain amplification means includes a plurality of variable preamplifiers, each coupled with a respective transducer element, and wherein said gain sensitivity control means includes a sensitivity time control circuit, coupled with said rate signal means and each of said variable preamplifiers, to control the gain of said preamplifiers.

9. The ultrasonic diagnostic apparatus of claim 2 further comprising a depth sensitivity control means coupled with said variable gain amplification means for increasing the gain of the variable gain amplification means as the depth of the echo signal increases.

10. An ultrasonic diagnostic apparatus for displaying a tomographic image of an object to be investigated, the apparatus comprising:

a transducer means, including an array of ultrasonic vibration elements, for applying beams of ultrasonic waves into the object at preselected steering angles, receiving ultrasonic echo signals reflected from the object and converting the received signals into electric echo signals;

transmitter means coupled with said transducer means for applying timed electric pulses to the array of ultrasonic vibration elements in a manner that produces beams of ultrasonic waves deflected at preselected steering angles;

variable band pass filter means for receiving electric echo signals from said transducer means and selectively filtering the received electric echo signals;

signal means for producing signals representative of the steering angle of each respective ultrasonic beam;

a frequency sensitivity control means responsive to the deflection angle of the respective ultrasonic beams and coupled with said signal means and said variable band pass filter means for decreasing the band pass of the variable band pass filter as the steering angle of the respective ultrasonic beams increases; and display means coupled with said variable gain amplification means for converting the filtered echo signals into a tomographic image of the object being investigated.

11. The ultrasonic diagnostic of claim 10 further comprising a means for producing a rate control signal and means for producing a reference signal, each of those means being coupled with said frequency sensitivity control means.

12. The ultrasonic diagnostic apparatus of claim 11 wherein said frequency sensitivity control means includes:
   a first counter coupled with said rate signal means for deriving degree signals representative of the steering angles of respective ultrasonic waves,
   a second counter coupled with said reference signal means for deriving depth signals representative of the depths of respective ultrasonic waves;
   an address generator coupled with said first and second counters for producing an address signal;
   a memory coupled with said address generator for storing filter coefficient signals; and
   conversion means coupled with said memory and with said variable band pass filter means for applying selected digital filter coefficient signals to the variable band pass filter means to control said variable band pass filter means.

13. The apparatus of claim 10 further comprising a variable gain amplification means coupled with said transducer means for receiving electric echo signals from said transducer means and amplifying the echo signals and gain sensitivity control means coupled with said variable gain amplification means for increasing the gain of the variable gain amplification means as the steering angle of the respective ultrasonic beam increases.

\* \* \* \* \*